(12) United States Patent
Oppolzer et al.

(10) Patent No.: US 10,737,691 B2
(45) Date of Patent: Aug. 11, 2020

(54) TRAJECTORY-BASED GUIDANCE OF A MOTOR VEHICLE

(71) Applicant: Robert Bosch GmbH, Stuttgart (DE)

(72) Inventors: Lukas Oppolzer, Heilbronn (DE); Thomas Brettschneider, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 116 days.

(21) Appl. No.: 16/011,774

(22) Filed: Jun. 19, 2018

(65) Prior Publication Data

US 2018/0362025 A1   Dec. 20, 2018

(30) Foreign Application Priority Data

Jun. 19, 2017   (DE) .................. 10 2017 210 171

(51) Int. Cl.
| | |
|---|---|
| *B60W 30/06* | (2006.01) |
| *G05D 1/02* | (2020.01) |
| *B60W 30/09* | (2012.01) |
| *G08G 1/16* | (2006.01) |
| *B62D 15/02* | (2006.01) |

(52) U.S. Cl.
CPC .......... *B60W 30/06* (2013.01); *B62D 15/028* (2013.01); *B62D 15/0285* (2013.01); *G05D 1/0212* (2013.01); *G05D 1/0231* (2013.01); *B60W 2554/00* (2020.02); *B60W 2710/20* (2013.01); *G05D 2201/0213* (2013.01)

(58) Field of Classification Search
CPC ........ B60W 30/06; B60W 30/09; G05D 1/02; G05D 1/00; G08G 1/16; G08B 7/06; B60Q 9/00; G01C 21/34; G01L 22/00
See application file for complete search history.

(56) References Cited

U.S. PATENT DOCUMENTS

| | | | | |
|---|---|---|---|---|
| 6,480,768 | B1 * | 11/2002 | Torii | B62D 1/28 180/167 |
| 10,421,398 | B2 * | 9/2019 | Igarashi | G08G 1/165 |
| 2007/0299610 | A1 * | 12/2007 | Ewerhart | B60T 7/22 701/301 |
| 2008/0167820 | A1 * | 7/2008 | Oguchi | B60W 40/09 701/301 |
| 2015/0025708 | A1 * | 1/2015 | Anderson | A61B 5/6804 701/2 |
| 2015/0329046 | A1 * | 11/2015 | Igarashi | G08G 1/165 340/435 |

(Continued)

FOREIGN PATENT DOCUMENTS

| | | | | |
|---|---|---|---|---|
| CN | 105652874 A | * | 6/2016 | ............... G05D 1/00 |
| DE | 102013015348 A1 | | 4/2014 | |

(Continued)

*Primary Examiner* — Yuri Kan
(74) *Attorney, Agent, or Firm* — Norton Rose Fulbright US LLP; Gerard Messina

(57) ABSTRACT

A method includes determining a first trajectory of the motor vehicle during a driver-controlled movement of the motor vehicle; determining a second trajectory on the basis of the first trajectory; and storing the second trajectory for the subsequent driver-independent guidance of the motor vehicle on the second trajectory. In this case, the second trajectory includes an optimization of the first trajectory.

13 Claims, 4 Drawing Sheets

(56) References Cited

U.S. PATENT DOCUMENTS

| | | | | |
|---|---|---|---|---|
| 2015/0367847 A1* | 12/2015 | Haeussler | ............ | B60W 50/10 |
| | | | | 701/41 |
| 2016/0264132 A1* | 9/2016 | Paul | .................... | G05D 1/0016 |
| 2017/0256147 A1* | 9/2017 | Shanahan | ................ | G08G 1/00 |
| 2018/0292222 A1* | 10/2018 | Lin | ...................... | G05D 1/0088 |
| 2019/0012920 A1* | 1/2019 | Tamura | .................. | G08G 1/166 |
| 2019/0215495 A1* | 7/2019 | Dendi et al. | ............. | G05D 1/00 |

FOREIGN PATENT DOCUMENTS

| | | |
|---|---|---|
| DE | 102014014219 A1 | 4/2015 |
| DE | 102015210357 A1 | 12/2016 |
| WO | 2017041927 A1 | 3/2017 |

* cited by examiner

TRAJECTORY-BASED GUIDANCE OF A MOTOR VEHICLE

RELATED APPLICATION INFORMATION

The present application claims priority to and the benefit of German patent application no. 10 2017 210 171.7, which was filed in Germany on Jun. 19, 2017, the disclosure which is incorporated herein by reference.

FIELD OF THE INVENTION

The present invention relates to the driver-independent guidance of a motor vehicle. In particular, the present invention relates to the guidance of the motor vehicle along a predetermined trajectory.

BACKGROUND INFORMATION

A motor vehicle includes a driver assistance function which is to relieve the driver during the guidance of the motor vehicle. For different purposes, numerous proposals have been made for driver assistance functions. For example, a parking or unparking process of a motor vehicle may be actively assisted or even autonomously carried out with the aid of a corresponding driver assistance system.

Patent document DE 10 2014 014 219 A1 relates to a method for carrying out a parking process of a vehicle.

For some driver assistance systems, in particular more complex systems which, in a further expansion stage, are to enable autonomous travel of the motor vehicle, a trajectory to be traveled must already be present. In order to determine the trajectory, a planning program may be utilized, for example, or the trajectory may be manually traveled by a driver and simultaneously stored. The quality of such a trajectory is frequently not cogent, however, due to a multitude of possible influence factors.

SUMMARY OF THE INVENTION

One object of the present invention is therefore that of providing an improved technology, with the aid of which a trajectory for the subsequent driver-independent guidance of the motor vehicle may be defined in an improved way. The present invention achieves this object with the aid of the subject matter of the main descriptions herein. The further descriptions herein describe specific embodiments.

A method includes steps of determining a first trajectory of the motor vehicle during a driver-controlled movement of the motor vehicle; of determining a second trajectory on the basis of the first trajectory; and of storing the second trajectory for the subsequent driver-independent guidance of the motor vehicle on the second trajectory. In this case, the second trajectory includes an optimization of the first trajectory.

As a result, on the one hand, the caution and experience of the driver may be profited from, in that the first trajectory is scanned under his/her guidance and, on the other hand, errors, carelessness, or inaccuracies, which are practically unavoidable during travel controlled by a person, may be reduced. The second trajectory may be utilized, in an improved way, for guiding the motor vehicle with the aid of a subsequent driver assistance system. In one simple specific embodiment, the second trajectory may be followed with the aid of such a driver assistance system. In yet another specific embodiment, the driver assistance system may control a more comprehensive or more complex sequence, a part of which includes following the second trajectory.

The trajectory may be optimized with respect to different criteria. In one first variant, the optimization includes a reduction of changes in direction. For example, during parallel parking into a parking spot, the first trajectory may include reversing and forward driving when, after the first attempt, the motor vehicle still extends too far into the roadway. Within the scope of the optimization, such a situation may be detected and the second trajectory may be determined in such a way that a minimized (or reduced) number of changes in direction is included.

In a second variant, the motor vehicle is moved on a predefined maneuvering area, the optimization including a maximization of a minimum distance between an outline of the motor vehicle and a boundary of the maneuvering area. The maneuvering area may be indicated, for example, as a planning area and, in particular, may have a rectangular shape. Alternatively, the maneuvering area may also be defined in terms of its shape and size on the basis of structural or statutory conditions. During travel along one of the trajectories, different points of the outline of the motor vehicle may each come close to a boundary of the maneuvering area. By maximizing the minimum distance, a compensation may be achieved, so that, overall, the motor vehicle is surrounded by a maximized safety distance during the travel along the second trajectory. The risk of touching an object which lies at the boundary of the maneuvering area, or a moving object on the maneuvering area which may not be able to easily get out of the way between the boundary and the motor vehicle, may be reduced in this way.

In a third variant, an object in the area of the motor vehicle is scanned during the driver-controlled movement of the motor vehicle, the optimization including a maximization of a minimum distance between an outline of the motor vehicle and the object. In a similar way, as described above, a safety distance around the motor vehicle may be maximized in this way.

Overall, the optimization may be carried out in such a way that the travel along the second trajectory by a person within or outside the motor vehicle is perceived as elegant and reliable. An acceptance of the method, in particular by a driver of the motor vehicle, may be enhanced as a result. In addition, loads on the motor vehicle, for example during a change in direction, during negotiating a curve, during accelerating or decelerating, may be minimized.

In one fourth variant, the optimization includes a circumvention of an object which lies on the first trajectory. Such an object may include an obstacle such as a manhole cover, a pothole, or a potentially slippery roadway marking. A comfort of the transport of the motor vehicle may be enhanced as a result and a load on the motor vehicle may be reduced.

In one fifth variant, the optimization includes a maximization of an angle at which an object on the second trajectory is driven over. The object may be, for example, a threshold, a channel, or a curb. It may be sought that the angle is approximately 90°. In particular, it may be sought that wheels of one axle of the motor vehicle roll over the object essentially simultaneously. A rolling movement of the motor vehicle, which may be induced by the object being driven over non-simultaneously, may be avoided as a result. A lifting or dropping movement of the motor vehicle may be perceived by a person on board as less unpleasant. In addition, the risk of damage to a tire or a wheel rim may be reduced.

In one sixth variant, multiple second trajectories are determined, the end positions of which are laterally offset with respect to each other. In particular, during parking of the motor vehicle into a garage or a parking spot, it may be ensured, in this way, that the parking position of the motor vehicle at the end of the second trajectory may be varied. A driver assistance system to be built upon the method may utilize this additional degree of freedom in order to facilitate an exit by persons on board the motor vehicle. In particular, the motor vehicle may be steered on that second trajectory which ensures maximum lateral space for a person on board the motor vehicle at the end of the second trajectory. This person regularly includes the driver. One or multiple additional persons may also be taken into account, however.

If in the case of a left-hand driven motor vehicle, only the driver is on board, for example, a second trajectory may be selected, which allows for as much space as possible on the left side of the motor vehicle in the end position, so that the driver may comfortably open the vehicle door and exit the motor vehicle. If several persons are present on different lateral sides of the motor vehicle, the second trajectory may be selected in such a way that all (or many) persons have maximum (or increased) lateral space for opening doors of the motor vehicle and for exiting the motor vehicle. The presence of persons on the left side or the right side of the vehicle may be determined, for example, with the aid of a seat occupancy sensor or an interior monitoring system.

A computer program product includes program code for carrying out the above-described method when the computer program product runs on a processing unit or is stored on a machine-readable data carrier.

A device includes a scanning unit for determining a first trajectory of the motor vehicle during a driver-controlled movement of the motor vehicle; a processing unit which is configured for determining an optimized second trajectory on the basis of the first trajectory; and a memory unit for storing the second trajectory for the subsequent driver-independent guidance of the motor vehicle on the second trajectory.

The device may include, in particular, a programmable microcomputer or microcontroller. The processing unit may be configured for carrying out the above method in entirety or in part. Due to this close relationship, features or advantages of the device may also be transferred to the method, and vice versa.

The present invention will now be described in greater detail with reference to the attached figures.

DETAILED DESCRIPTION

Figure 1:
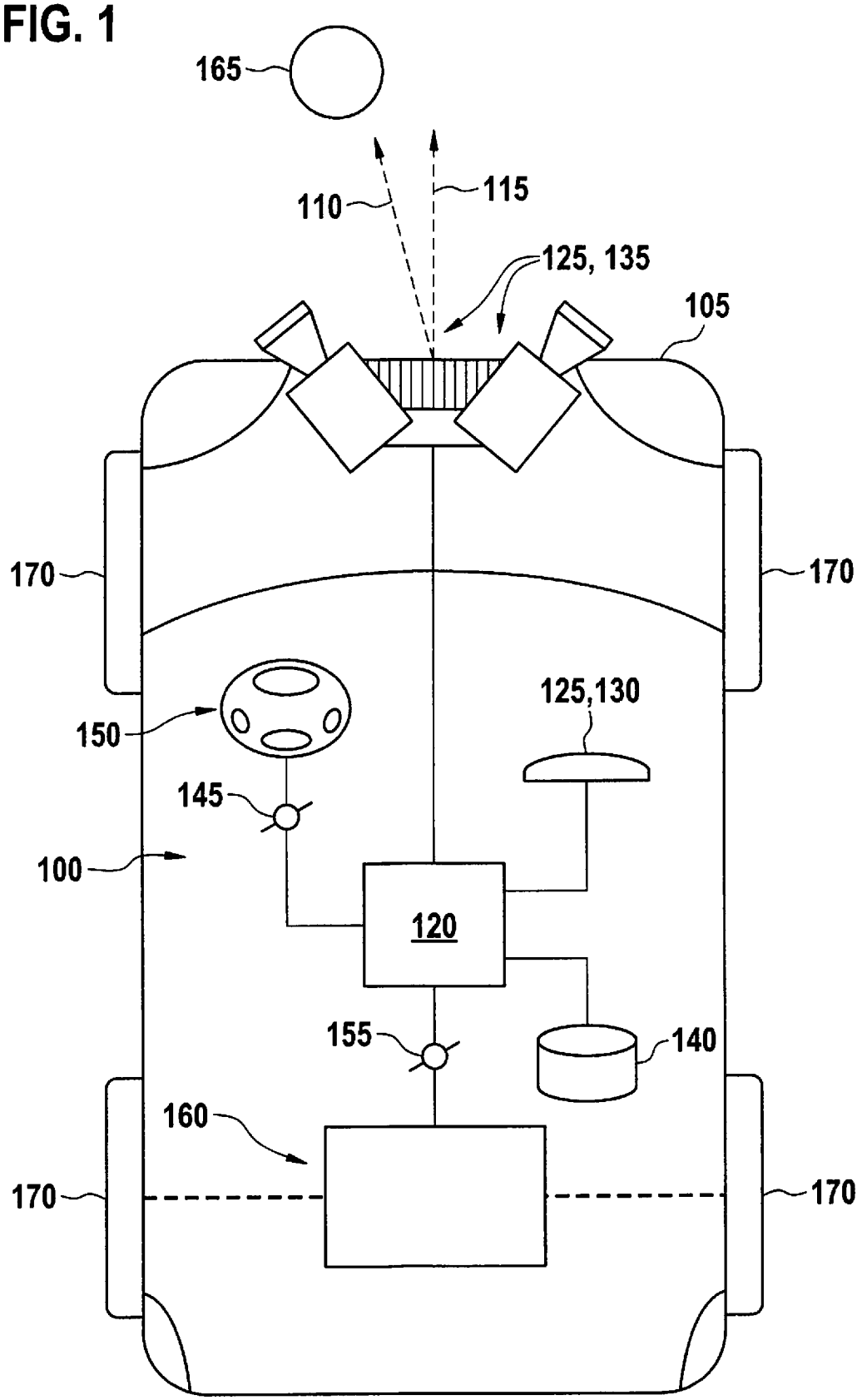
FIG. 1 shows a motor vehicle including a control unit.

FIG. 1 shows a device 100 on board a motor vehicle 105. Motor vehicle 105 may include a passenger car, although, in other specific embodiments, the motor vehicle may also include, for example, a commercial vehicle such as a truck. Device 100 is configured for determining a first trajectory 110 which motor vehicle 105 describes while it is steered by a driver, and for optimizing first trajectory 110 into a second trajectory 115.

Device 100 includes a processing unit 120, at least one scanning unit 125 which may be formed, for example, by a positioning unit 130 or a surroundings detection unit 135, and one memory unit 140. Optionally, a first interface 145 to a lateral control 150 or a second interface 155 to a longitudinal control 160 of motor vehicle 105, or both, may be provided.

Scanning unit 125 is configured for determining first trajectory 110 of motor vehicle 105. First trajectory 110 runs between a starting point and an end point and usually performs a maneuvering task of the motor vehicle, for example parking or unparking at a predetermined parking position. The starting and end positions usually lie relatively close to each other, for example in the range of less than 5 m, approximately 5 m to 10 m, or up to a maximum of approximately 20 m or 50 m. In other specific embodiments, the positions may also be distant from each other by 100 m or in the range of up to 1 km or several km. The starting and end positions are usually geographically defined and, therefore, are statically established.

Positioning unit 130 may include, in particular, a navigation receiver of a, for example, satellite-assisted navigation system or a highly accurate inertial sensor system. Additional sensors may be utilized in order to increase the positioning accuracy. The surroundings detection unit 135 may include, for example, an optical camera, an infrared camera, a radar or LIDAR sensor, or an ultrasonic system. With the aid of surroundings detection unit 135, a movement of motor vehicle 105 may be deduced, on the one hand and, on the other hand, an object 165 in the surroundings of motor vehicle 105 may be determined. Further objects 165 may be stored, for example, in a map memory of a navigation system which may include positioning unit 130.

Lateral control 150 is usually formed by a steering unit of motor vehicle 105. Via first interface 145, an alert regarding a change in direction of motor vehicle 105 may be received during the travel along first trajectory 110. During driver-independent travel along second trajectory 115, lateral control 150 may be correspondingly controlled via first interface 145. Longitudinal control 160 usually includes a drive motor which may be configured, in particular, as an electric motor, an internal combustion engine, or a combination of the two. Longitudinal control 160 may act on arbitrary wheels 170 of motor vehicle 105. In general, it may be provided that motor vehicle 105 is two-track and wheels 170 are mounted in pairs on axles. During travel along first trajectory 110, an alert regarding the longitudinal movement of motor vehicle 105 may be received via second interface 155. During the driver-independent travel along second trajectory 115, longitudinal control 160 may be controlled via second interface 155.

In particular, additional or alternative sensors may be provided on board motor vehicle 105 for scanning first trajectory 110. For example, rotation-angle or speed sensors may be provided at wheels 170 or the determination of a position of motor vehicle 105 may take place on the basis of an external unit which may include, in particular, an optical tracking system of motor vehicle 105.

Figure 2:
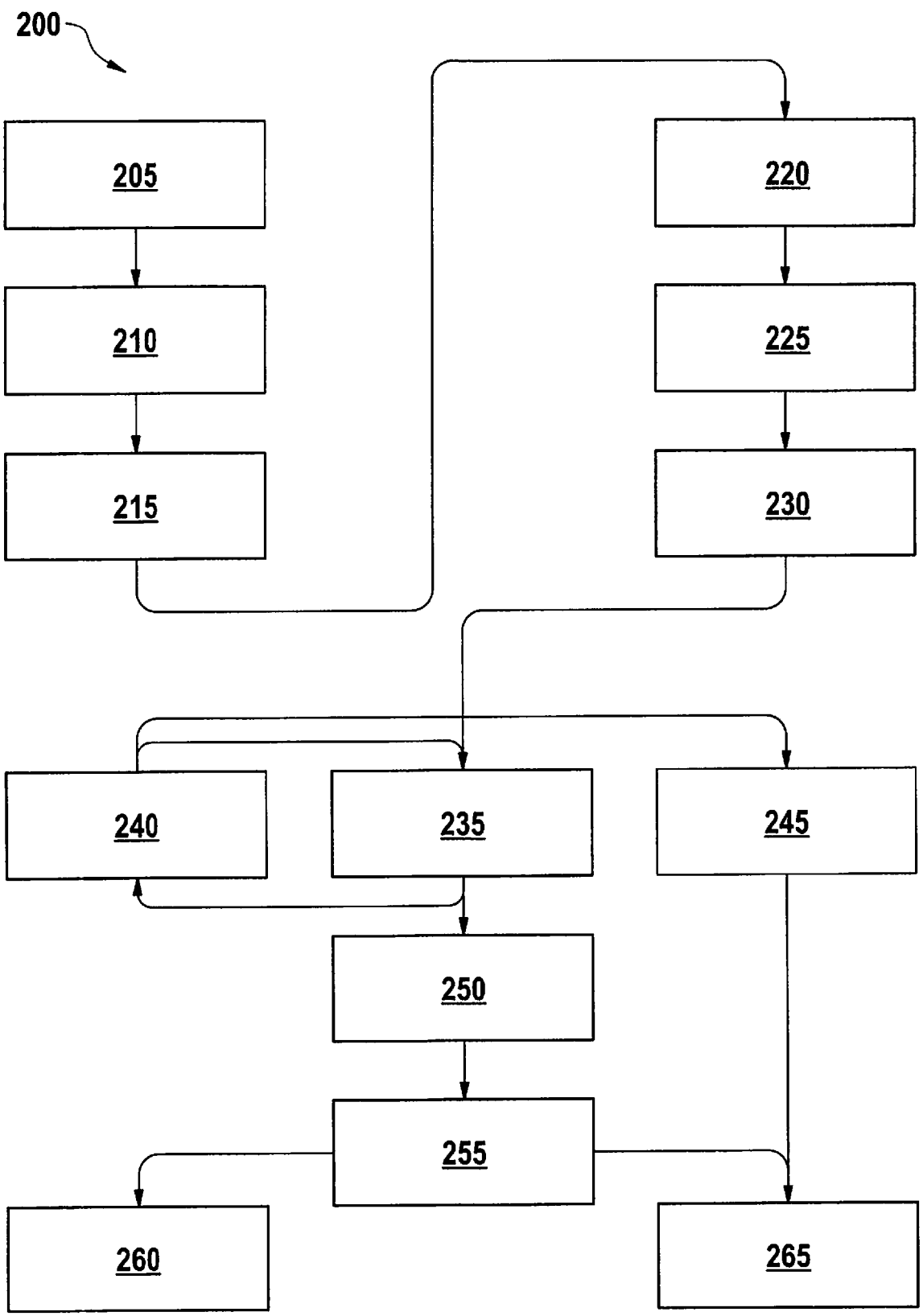
FIG. 2 shows a flow chart of a method.

FIG. 2 shows a flow chart of a method 200 for controlling motor vehicle 105. In a first step 205, motor vehicle 105 is located at a starting position, from which first trajectory 110 extends. Method 200 may be initiated, for example, in that a driver manually starts the recording of first trajectory 110, or processing unit 120 makes a corresponding recommendation, which a driver of motor vehicle 105 accepts.

In a step 210, first trajectory 110 is scanned while motor vehicle 105 is steered by the driver. The driver may operate the usual actuators and control units on board motor vehicle 105, in particular a steering wheel for the lateral control or pedals for the longitudinal control. In other specific embodiments, the control of motor vehicle 105 may also be controlled, for example, with the aid of a touchscreen, a contactless input device, or in another way. The driver may also exit motor vehicle 105 and effectuate the control in close proximity, for example with the aid of a wireless control unit. In order to avoid the loss of control, it may be provided that a maximum distance of the driver from motor vehicle 105 is limited, for example, to approximately 5 m to 10 m or up to a maximum of 20 m.

In a step 215, motor vehicle 105 has reached the target position at the end of first trajectory 110. The end of the recording process may be effectuated, for example, by the driver or may be automatically detected on the part of processing unit 120 due to a longer absence of a change in position.

In a step 220, on the basis of first trajectory 110, an optimized second trajectory 115 is determined, which usually has the same starting point and the same end point as first trajectory 110. Trajectory 115 may be determined, in particular, as a polynomial on the basis of the first trajectory or a section thereof. Optimized trajectory 115 may be composed of separately optimized sections, each of which may be determined as an optimization of a section of first trajectory 110. Different embodiments for the optimization are described in greater detail below with reference to FIGS. 3 through 6. In some specific embodiments, multiple second trajectories 115 may also be determined. In a step 225, one or several of the determined second trajectories 115 may be accepted or rejected by an operator, in particular the driver of motor vehicle 105, during step 210. At least one second trajectory 115 may then be stored in memory unit 140.

In order to control second trajectory 115, it may be offered that motor vehicle 105 travel along the second trajectory driver-independently while the driver monitors the process. In a step 230, an offer for this type of process may be made, which the driver may accept. Conversely, the driver may also initiate the process. Optionally, one of several second trajectories 115 is/are selected by the driver. In one specific embodiment, the driver him/herself ensures that motor vehicle 105 is located at the starting position of second trajectory 115, in particular in that he/she steers motor vehicle 105 to the starting position him/herself. In yet another specific embodiment, an autonomous guidance of motor vehicle 105 to the starting position may take place. In yet another specific embodiment, motor vehicle 105 is located at the end position of second trajectory 115 and second trajectory 115 is traveled along in the opposite direction. If a parking process was carried out, for example, during step 210, then the unparking process corresponding thereto may now be controlled, in which case the starting and end positions are interchanged with respect to first trajectory 110.

In a step 235, motor vehicle 105 is steered driver-independently on second trajectory 115. For this purpose, lateral control 150 and/or longitudinal control 160 may be influenced, in particular, via at least one of the interfaces 145, 155. The travel may be interrupted by the driver at any time in a step 240. The driver may be located on a driver's seat or at any other arbitrary position in the surroundings of motor vehicle 105. In order to pause, the driver may activate an operating element or a transition into the pause state may take place when the driver fails to activate an operating element (dead man's switch). The travel along second trajectory 115 may take place at a low speed. The speed may be limited, in particular, for example to approximately 2 km/h to 5 km/h. The driver may switch, at any time, from step 235 during the driving of motor vehicle 105 or from step 240 while motor vehicle 105 is stopped, into step 245 and abort the execution of method 200.

If an abort does not take place, motor vehicle 105 usually reaches the end position of second trajectory 115 in a step 250. Optionally, in a step 255, the driver may decide whether second trajectory 115 is to be finally accepted and retained in memory unit 140, in a step 260, or rejected, in a step 265. In this case, trajectory 110 may be retained, however.

Figure 3:
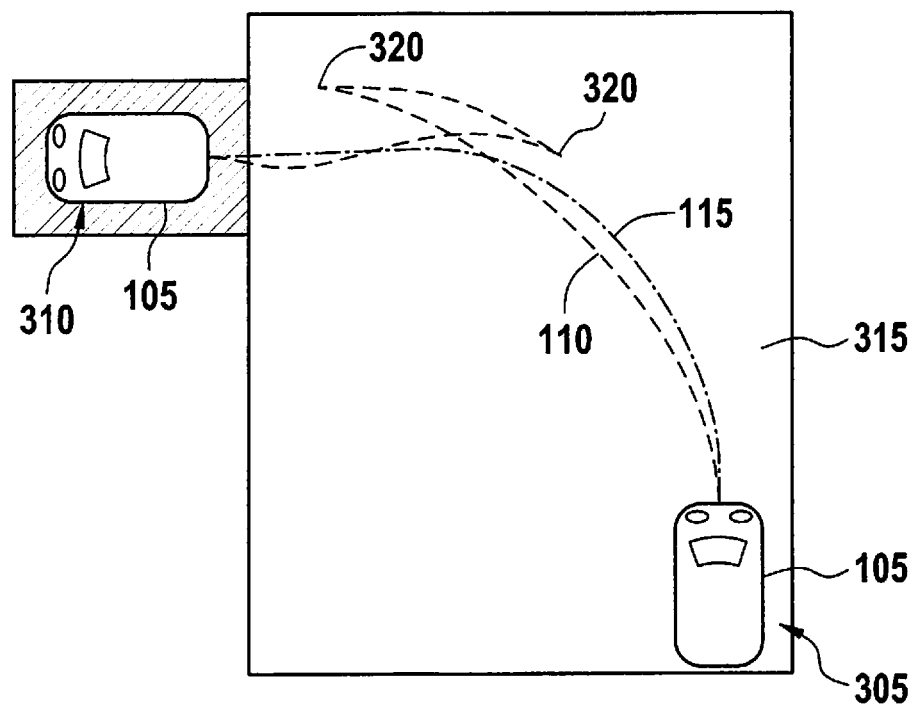
FIGS. 3, 4, 5 and 6 show examples of driven and optimized trajectories of a motor vehicle.

FIG. 3 shows a first example for explaining the optimization in step 220 of method 200 from FIG. 2. Motor vehicle 105 is to be moved from a starting position 305 to an end position 310.

For this purpose, a maneuvering area 315 may be predefined, the boundary of which must not be violated or crossed by outlines of motor vehicle 105. Driver-controlled first trajectory 110 and driver-independent second trajectory 115 are plotted as interrupted lines. In the present example, first trajectory 110 includes two changes in direction 320, at which a switch is made from forward travel to reverse travel, or vice versa. This is required, because first trajectory 110 was selected to be straight flat to bring motor vehicle 105 to end position 310 without exiting maneuvering area 315. Optimized second trajectory 115 selects a larger curve radius between starting position 305 and end position 310, so that the two changes in direction 320 may be dispensed with.

Figure 4:
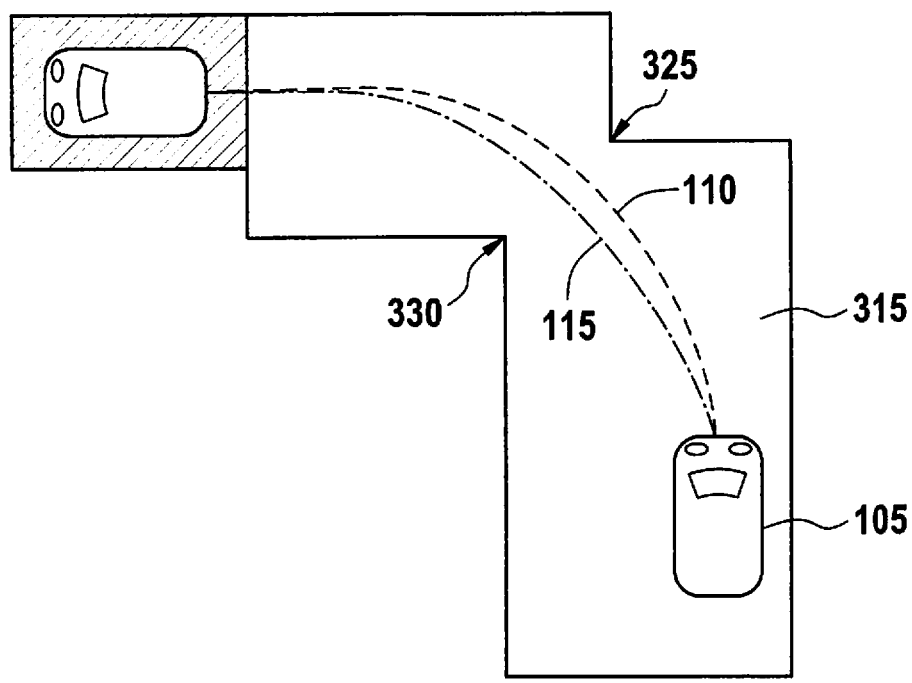

FIG. 4 shows a second example for an optimization. Maneuvering area 315 is constricted between exemplary points 325 and 330. A minimum distance between first trajectory 110 and first point 325 is less than between first trajectory 110 and second point 330. In other words, motor vehicle 105 on first trajectory 110 passes by closer to first point 325 than to second point 330. Second trajectory 115 is optimized in such a way that distances to points 325, 330 or distances between outlines of motor vehicle 105 and points 325 and 330 may be of equal size. The risk of an insufficient safety distance in an arbitrary direction of motor vehicle 105 may be minimized in this way.

Figure 5:
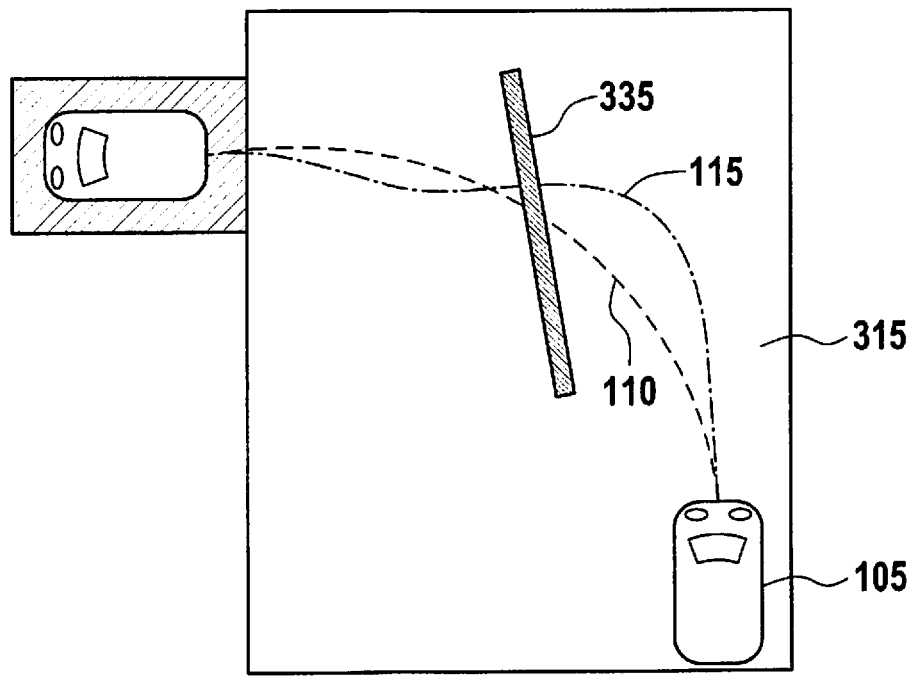

FIG. 5 shows a third example of an optimization. The two trajectories 110, 115 cross over an elongated object 335 which may include, for example, a gutter, a threshold, or another obstacle. Object 335 may correspond to object 165 from FIG. 1. Generally, however, it is to be noted that object 335 shown here may be traversed, in principle, but the traversing has disadvantages, such as increased wear or driving instability. What is not meant at this point is an object 165 to be avoided, for example, a person, a wall, or a post, which must not be driven over.

An angle between first trajectory 110 and object 335 is relatively small, so that wheels 170 of the same axle of motor vehicle 105 roll over object 335, one after the other. The angle enclosed by second trajectory 115 with object 335 is considerably greater, however, and may be approximately 90°, so that wheels 170 of the same axle of motor vehicle 105 roll over object 335 essentially simultaneously.

Figure 6:
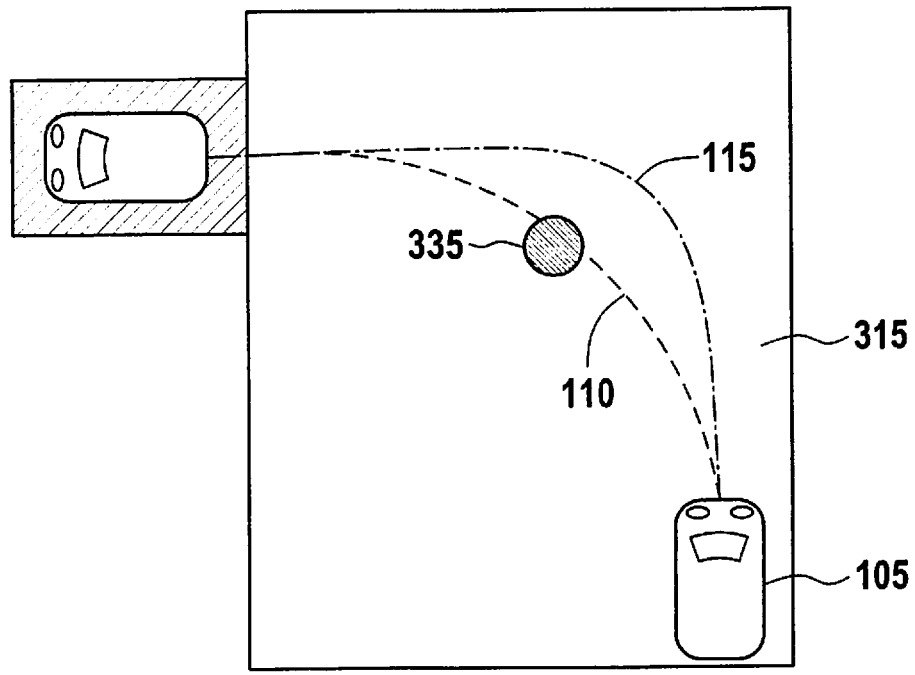

FIG. 6 shows a fourth example of an optimization of a trajectory. While first trajectory 110 passes over an object 335 which is indicated to be circular, by way of example, second trajectory 115 passes around object 335 in such a way that no wheel 170 rolls over object 335 or no outline of motor vehicle 105 brushes against object 335.

What is claimed is:

1. A method, the method comprising:
    recording a first trajectory of a motor vehicle during a driver-controlled movement of the motor vehicle;
    determining, using a processor, a second trajectory using and as a function of the recorded first trajectory;

storing the determined second trajectory for a subsequent driver-independent guidance of the motor vehicle on the second trajectory, wherein the determined second trajectory includes an optimization of the recorded first trajectory; and automatically controlling the motor vehicle to travel along the determined second trajectory in a driver-independent manner;

wherein the optimization includes a reduction of changes in direction.

2. The method of claim 1, wherein the motor vehicle is moved on a predefined maneuvering area and the optimization includes a maximization of a minimum distance between an outline of the motor vehicle and a boundary of the predefined maneuvering area.

3. The method of claim 1, wherein, during the driver-controlled movement of the motor vehicle, an object in the area of the motor vehicle is scanned and the optimization includes a maximization of a minimum distance between an outline of the motor vehicle and the object.

4. The method of claim 1, wherein the optimization includes a circumnavigation of an object which lies on the first trajectory.

5. The method of claim 1, wherein the optimization includes a maximization of an angle at which an object on the second trajectory is traversed.

6. The method of claim 1, wherein several second trajectories are determined, the end positions of which are laterally offset with respect to each other.

7. The method of claim 1, wherein the motor vehicle is steered driver-independently on the second trajectory.

8. The method of claim 6, wherein the motor vehicle is steered on that second trajectory which ensures maximum lateral space for a person on board the motor vehicle at the end of the second trajectory.

9. A non-transitory computer readable medium having a computer program, which is executable by a processor, comprising:
  a program code arrangement having program code for performing the following:
    recording a first trajectory of a motor vehicle during a driver-controlled movement of the motor vehicle;
    determining a second trajectory using and as a function of the recorded first trajectory;
    storing the determined second trajectory for a subsequent driver-independent guidance of the motor vehicle on the determined second trajectory, wherein the determined second trajectory includes an optimization of the recorded first trajectory; and
    automatically controlling the motor vehicle to travel along the determined second trajectory in a driver-independent manner;
  wherein the optimization includes a reduction of changes in direction.

10. A device, comprising:
  a scanning unit configured to determine a first trajectory of a motor vehicle during a driver-controlled movement of the motor vehicle, the scanning unit including a positioning unit of the motor vehicle and/or a surroundings detection unit of the motor vehicle;
  a processing unit configured to determine an optimized second trajectory using and as a function of the first trajectory; and
  a memory unit storing the determined second trajectory for a subsequent driver-independent guidance of the motor vehicle on the second trajectory;
  wherein the processing unit includes a computer processor, and wherein the processing unit is configured to automatically control the motor vehicle to travel along the determined second trajectory in a driver-independent manner;
  wherein the optimization includes a reduction of changes in direction.

11. The device as recited in claim 10, wherein the positioning unit includes a satellite-assisted navigation system or an inertial sensor system, and wherein the surroundings detection unit includes an optical camera or an infrared camera or a radar sensor or a LIDAR sensor or an ultrasonic system.

12. A non-transitory computer readable medium having a computer program, which is executable by a processor, comprising:
  a program code arrangement having program code for performing the following:
    recording in a memory unit a first trajectory of the motor vehicle during a driver-controlled movement of the motor vehicle;
    determining a second trajectory using and as a function of the recorded first trajectory;
    storing the determined second trajectory for a subsequent driver-independent guidance of the motor vehicle on the determined second trajectory, wherein the determined second trajectory includes an optimization of the recorded first trajectory; and
    automatically controlling the motor vehicle to travel along the determined second trajectory in a driver-independent manner
  wherein:
    several second trajectories are determined, the end positions of which are laterally offset with respect to each other; and
    the motor vehicle is steered on that second trajectory which ensures maximum lateral space for a person on board the motor vehicle at the end of the second trajectory.

13. A device comprising:
  a scanning unit for determining a first trajectory of a motor vehicle during a driver-controlled movement of the motor vehicle, the scanning unit including a positioning unit of the motor vehicle and/or a surroundings detection unit of the motor vehicle;
  a processing unit configured to determine an optimized second trajectory using and as a function of the first trajectory; and
  a memory unit storing the determined second trajectory for a subsequent driver-independent guidance of the motor vehicle on the second trajectory;
  wherein the processing unit includes a computer processor, and wherein the processing unit is configured to automatically control the motor vehicle to travel along the determined second trajectory in a driver-independent manner;
  wherein:
    several second trajectories are determined, the end positions of which are laterally offset with respect to each other; and
    the motor vehicle is steered on that second trajectory which ensures maximum lateral space for a person on board the motor vehicle at the end of the second trajectory.

* * * * *